S. B. WHITE.

STAMP AFFIXING MACHINE.

APPLICATION FILED SEPT. 7, 1911.

Reissued June 25, 1912.

13,435.

3 SHEETS—SHEET 1.

Witnesses

J. G. Hinkel

C. S. Brown.

Inventor

Samuel B. White

By Foster Freeman Watson & Coit

Attorneys

S. B. WHITE.

STAMP AFFIXING MACHINE.

APPLICATION FILED SEPT. 7, 1911.

Reissued June 25, 1912. 13,435.

3 SHEETS—SHEET 2.

Witnesses

J. G. Hinkel

C. S. Brown

Inventor

S. B. White

By Foster Freeman Watson & Coit

Attorneys

S. B. WHITE.

STAMP AFFIXING MACHINE.

APPLICATION FILED SEPT. 7, 1911.

Reissued June 25, 1912.

13,435.

3 SHEETS—SHEET 3.

Witnesses

J. G. Stinkel

C. S. Brown.

Inventor

Samuel B. White

By Foster Freeman Watson & Coit

Attorneys

UNITED STATES PATENT OFFICE.

SAMUEL B. WHITE, OF PROVIDENCE, RHODE ISLAND, ASSIGNOR, BY MESNE ASSIGNMENTS, TO THE OFFICE APPLIANCE MANUFACTURING COMPANY, A CORPORATION OF RHODE ISLAND.

STAMP-AFFIXING MACHINE.

13,435. Specification of Reissued Letters Patent. Reissued June 25, 1912.

Original No. 968,619, dated August 30, 1910, Serial No. 520,320. Application for reissue filed September 7, 1911. Serial No. 648,254.

*To all whom it may concern:*

Be it known that I, SAMUEL B. WHITE, a citizen of the United States, residing at Providence, in the county of Providence and State of Rhode Island, have invented certain new and useful Improvements in Stamp-Affixing Machines, of which the following is a specification.

My invention relates to machines for affixing postage stamps and gummed labels to envelops, cards and other articles, and is intended to attain this end by a simple, inexpensive and compact structure.

Further objects of the invention are to insure a severance of each stamp exactly at its line of perforation, and to maintain the stamp strip under perfect control at all times.

Additional objects of invention will appear from an examination of the drawings and following description.

Figure 1:
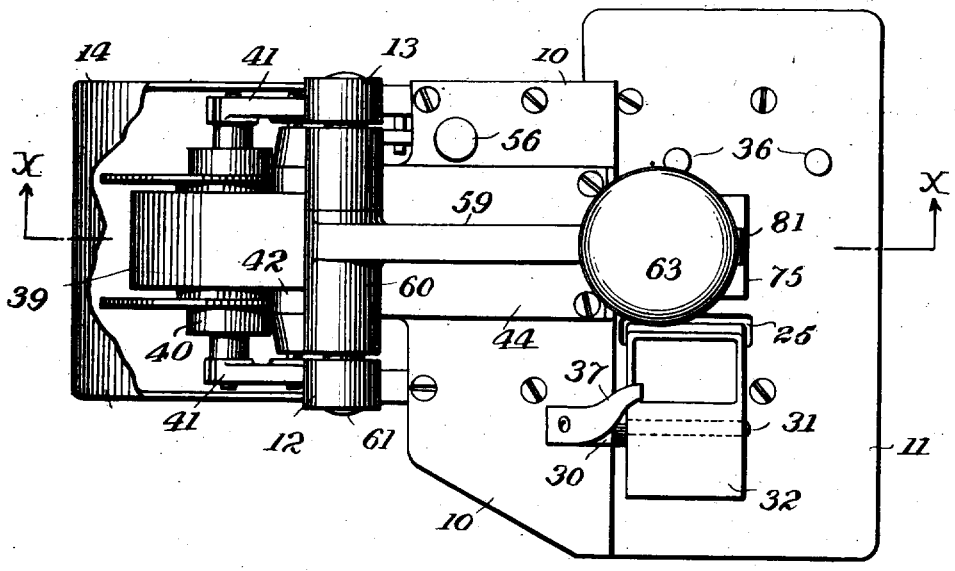
Figure 2:
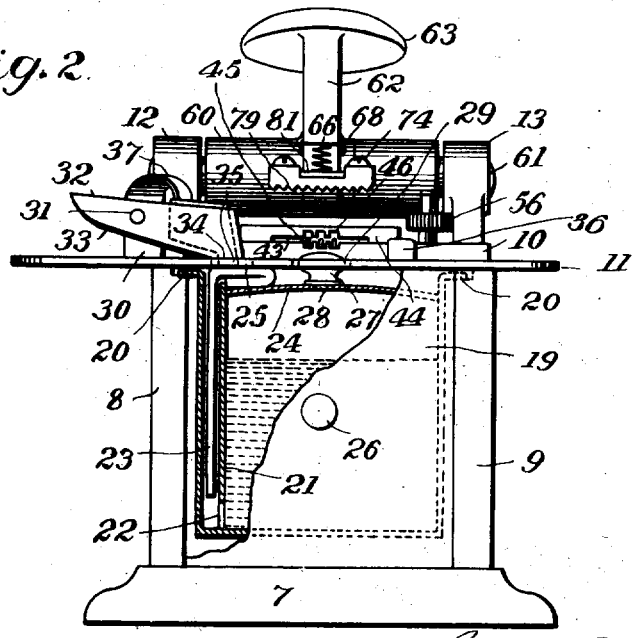
Figure 3:
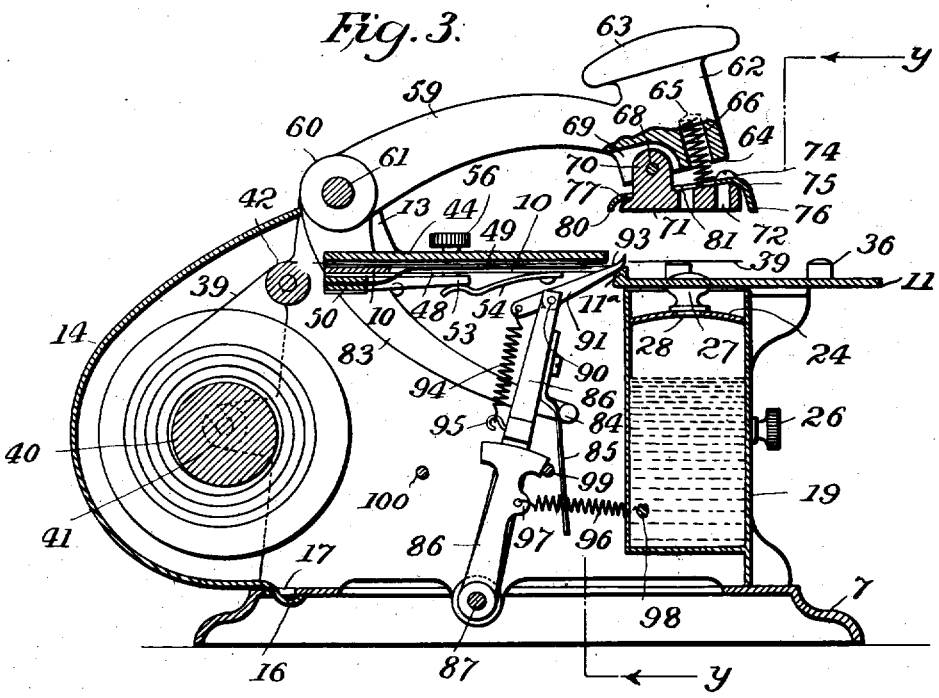
Figure 4:
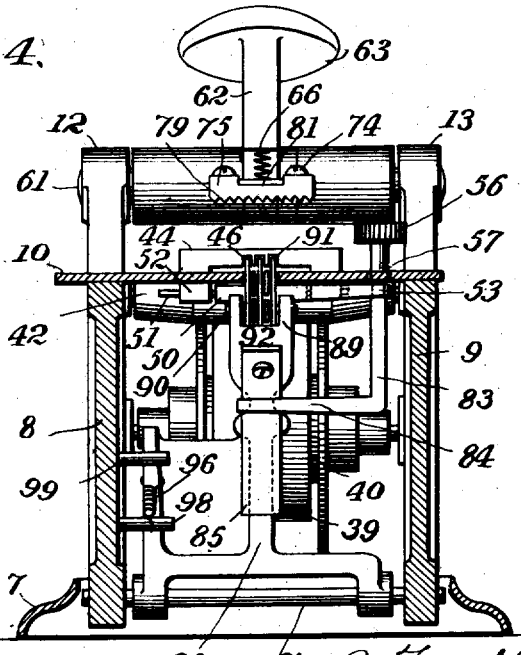
Figure 5:
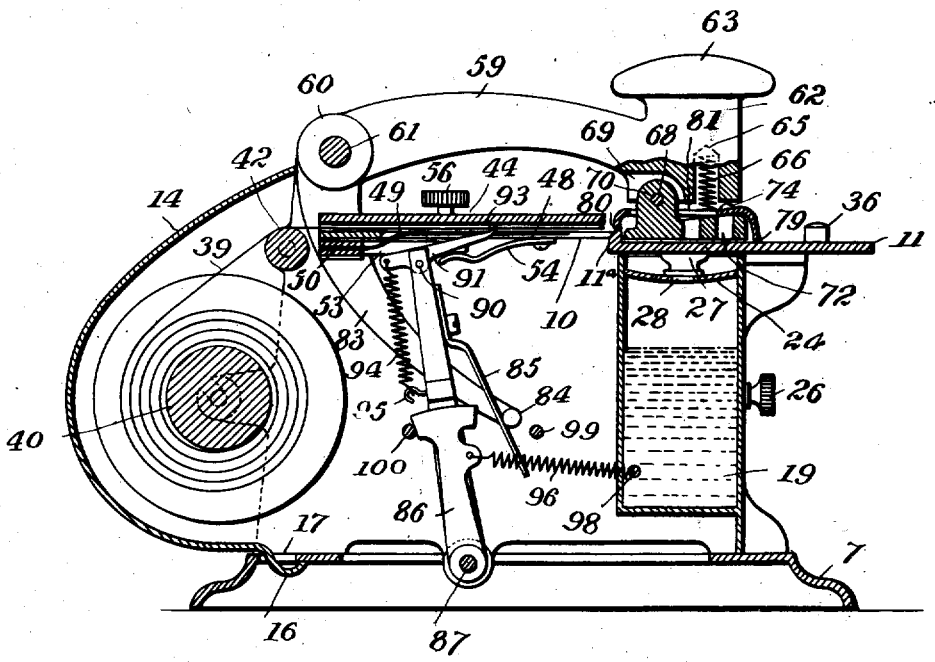

In the accompanying drawings, which form a part of this specification, Figures 1 and 2 are plan and front elevations respectively of a machine embodying my invention, a portion of the rear casing being broken away in Fig. 1, and a part of the tank being broken away in Fig. 2; Fig. 3, a section of the same on line *x x* of Fig. 1, omitting the moistening device; Fig. 4 a section on line *y y* of Fig. 3; and Fig. 5 a section similar to that of Fig. 3, showing the parts in another position of operation.

Like reference characters indicate like parts throughout the views.

In its present form of embodiment my machine comprises a hollow base 7 for a casing comprising side walls 8, 9, a top plate 10 and a platform or supporting plate 11 which projects forwardly and laterally in front of and in a slightly lower horizontal plane than the top plate. Upon the rear upper portions of the walls 8 and 9, are vertical ears 12 and 13 respectively. The casing includes an outwardly curved wall 14 which rests against the rear edges of the side walls and upon the base 7, being removably connected with the latter by a tongue 16 which passes through a slot 17 in the base. The front of the casing is closed by a rectangular tank 19 supported in the casing by lateral flanges 20. It is provided with an interior vertical partition 21 adjacent one end provided at its bottom with an opening 22 forming a vertical tube in which depends a wick whose upper end rests upon the top 24 of the tank immediately below an opening 25 in the support 11. Upon the front of the tank is a knob or handle 26. A screw 27 is threaded into a supply opening 28 in the top 24 and its convex head extends through an opening 29 in the support 11, slightly projecting above the plane of the latter. The top 24 is of thin spring metal and slightly convex. It follows that when the head of the screw 27 is downwardly pressed the liquid in the tank 19 is forced through the opening 22 upwardly around the wick 23 thus supplementing the capillary action of the wick, particularly when the supply of liquid in the tank is at a low level.

Near one end of the plate 10 is a block 30 with a pivot pin 31 upon which is mounted a carrier 32 having an inclined lower face 33 and provided with an opening 34 in its bottom through which projects a wick 35 extending also through the opening 25 and in contact with the wick 23. The carrier and its wick are normally downwardly pressed by a spring 37 fixed to the block 30 and contacting with the top of the carrier. The envelop is manually fed along the plate 11 from the left beneath the carrier 32, being guided in its course by the inclined bottom of the latter, and in passing has its upper face moistened by the wick 35 which is charged with moisture absorbed from the wick 23. The advance of the envelop is checked at the proper point by pins 36 upon the plate 11.

The stamps 39 in strip form are fed from a roll 40 journaled in bearings 41 formed upon the side walls of the casing. The strip thence passes over a tension roll 42 mounted in the walls above the roll 40 and passes intermediate the plate 10 and a plate 44 fixed upon the latter plate, and slightly interspaced therefrom as at 43. The front face of the plate 10 is slightly in advance of the corresponding face of the plate 44. The plates 10 and 44 are provided upon their respective inner faces with a plurality of central longitudinally disposed grooves 45 and 46. The front end of the stamp strip emerges from the passage 43 at right angles to and above the path of the envelop.

The tensioning means for the stamp strip during its advance is the following: The plate 10 has a central longitudinal slot 48 in which are a plurality of spring rods 49 fixed at their rear ends in a block 50 located immediately below the plate 10. The block 50 has pivot points 51 journaled in lugs 52 upon the bottom of plate 10. The rods 49 direct and press the stamp strip into contact with the under face of plate 44. Integral with the block 50 is a forwardly extending arm 53 whose outer end is upwardly pressed by a spring 54 in contact with its lower face and fixed to the bottom of plate 10. This spring normally maintains the rods 49 against the stamp strip. When however it is desired to introduce a fresh strip into the machine it is necessary to lower the rods 49. This result is attained by means of a pin 56 whose lower end is fixed to the arm 53, and which passes through an opening 57 in the plate 10 and extends above the latter. Downward pressure upon this pin turns the block 50 and its rods 49 downwardly out of the path of the stamp strip.

The stamp affixing device comprises a forwardly directed upwardly inclined arm 59 integral with a rocking sleeve or hub 60 or a rod 61 in the ears 12 and 13. The operating arm 59 terminates in a substantially vertical head portion 62 having a broad bearing portion 63 upon its top, and provided with an upwardly inclined bottom face 64. The head portion has a vertical cavity 65 to form a seat for a spiral spring 66. Pivoted upon a pin 68 in a cavity 69 of the head behind the cavity 65 is a lug 70 upon the upper face of a rectangular bearing plate 71 preferably provided with perforations 72. The rear edge of the bearing plate 71 is in vertical alinement with the front edge of the plate 10. Fixed by a screw 74 or otherwise to the upper face of the bearing plate 71 is a plate 75 of spring material having downwardly directed forward and rear ends 76 and 77 respectively, which are respectively provided with teeth or serrations 79 and 80. The plate 75 is provided with a central opening 81 to allow the passage of the lug 70 therethrough. The toothed lower edge 80 of the flange 77 extends to the rear of the back edge of the plate 71 so that the teeth of said flange are in alinement with the upturned flange or ledge 11ª of the platform 11. The feeding devices, to be presently described, advance the stamp strip as the arm 59 rises until the forward stamp stands over the platform 11 with its perforated line of division from the succeeding stamps standing over the edge of the ledge 11ª. As the arm 59 is depressed the teeth 80 clamp the stamp strip to the ledge 11ª at or slightly in rear of the perforations. Immediately thereafter the forward teeth 79 of the plate 75 engage the forward end of the projecting stamp and press it into engage: ent with the envelop or article on the platform 11. During the final portion of the downward movement of the arm 59 the bearing plate 71 rocks on its pivot 68 into the position shown in Fig. 5, tearing the foremost stamp from the strip along the line of perforations and pressing it onto the envelop or other object which is supported on the platform 11, which object has been moistened in passing it under the wick 35. The ledge 11ª forms a tearing edge which assists in severing the stamp strip. The bearing plate also acts upon the screw or knob 27 to depress the cover of the water tank and force a portion of the water up into the wick tube.

The mechanism for feeding the stamp strip to the affixing mechanism includes a downwardly and forwardly inclined arm 83 upon the sleeve 60 provided with a laterally extending end portion or pin 84 which bears against a flat spring 85 upon the front of an upright lever 86 pivoted at its lower end to a transverse pin or rod 87 in the side walls of the casing. The upper end of the lever 86 is provided with vertical ears 89 in which is fixed a pintle 90 upon which are pivoted intermediate their length a plurality of levers 91 interspaced from each other by plates 92. The forward ends 93 of these levers are slightly upturned, and the rear end of each lever is connected by a spring 94 to a hook 95 in the lever 86 below the pintle 90. The lever 86 is forwardly drawn by a spiral spring 96 connecting it at an intermediate point 97 with a pin 98 in the wall of the casing. Extreme forward and rearward travel of this lever is prevented by pins 99 and 100 respectively in the casing wall. The lever ends 93 normally project upwardly through the opening in the plate 10 above the plane of the plate and in the path of the stamp strip as shown in Fig. 3. The levers 91 are so interspaced as to naturally bring the several ends 93 into several openings of the line of perforations in the stamp strip. A plurality of these levers is employed to insure at least one end 93 entering a perforation.

The operation of the strip feed is as follows: With the parts in the position indicated in Fig. 3, the operating arm is depressed to affix a stamp. The arm 83 through its end 84 throws the lever 86 against its back stop 100 bringing the fingers 91 to a position behind a row of perforations in the strip 39, against which strip the lever ends 93 are pressed by the springs 94. The spring 85 which is stronger than the spring 96, and against which the end of the arm 83 immediately contacts, insures the movement of the arm 86 to its rearmost limit and consequently the positioning of the levers 91 at a point behind a row of perforations, regardless of the thickness of the envelop beneath the bearing plate or shoe 71, and cushions the blow of the latter. As soon as the arm 59 is released the spring 85 elevates the bearing plate above the line of travel of the stamp strip and forthwith the spring 96 forwardly impels the lever 86, causing the lever ends 93, in engagement with a line of perforations to carry the strip forward the distance of one stamp, thus projecting the forward stamp over the platform 11 with its rear edge or row of perforations located substantially over the forward edge or tearing edge of the ledge or flange 11[a].

The lever ends 93 normally register in the grooves 46 which serve as guides therefor and assist in the thorough engagement of the said ends in the perforations.

The resilient or flexible top or cover 24 of the tank acts as a pump for raising the water and may be manually operated through the projection 27, as well as automatically by the plate 71. The force of the blow of the latter is somewhat cushioned by the yielding projection.

It will be observed that by tearing the stamp from the strip rather than by severing the same by a knife, the stamps are severed exactly at their lines of perforations.

What I claim is:—

1. In a machine of the type set forth, the combination with a support for the article to be stamped, of a stamp affixing device above the support, a carrier above the support adjacent the affixing device, an absorbent material in the carrier, a wick in contact with the absorbent material and located in a liquid receptacle below the support, and means actuated by the affixing device for elevating the liquid in the receptacle.

2. In a machine of the type set forth, the combination with a support for the article to be stamped provided with an opening, a stamp affixing device, a tank below the support, a flexible cover over the tank, and a projection upon the cover extending through the opening in the path of the affixing device.

3. In a machine of the type set forth, the combination with a support for the article to be stamped, of a stamp-affixing device above the support embodying a bearing plate, a tank below the support and means carried by the tank below the bearing plate and in the path thereof for cushioning the stroke of the affixing device.

4. In a machine of the type set forth, the combination with the support for the articles to be stamped, of a vibratory operating arm above the support, oscillatory means coöperating with the arm for feeding a stamp into the path of the arm, means for clamping the stamp strip during the descent of the arm, means for coöperating with said arm to actuate said feeding means, and resilient means coöperating with said arm to insure movement of the latter to its rearmost position.

5. In a machine of the type set forth, the combination with the support for the article to be stamped, of a vibratory operating arm above the support, vibratory means for feeding a stamp to the operating arm, oscillatory means actuated by the operating arm for operating the vibratory means, means for clamping the stamp strip during the descent of the arm, means for coöperation with said arm to actuate the feeding means, and resilient means coöperating with said arm to insure movement of the latter to its rearmost position.

6. In a machine of the type set forth, the combination with a support for the article to be stamped, of a vibratory operating arm above the support, a pivotally mounted arm for feeding a stamp to the support, spring means for moving the arm in one direction, oscillatory means actuated by the operating arm for moving the stamp feeding arm in the opposite direction and a stronger spring movable with the oscillatory means for insuring the movement of the stamp feeding arm to its rearmost position.

7. In a machine of the type set forth, the combination with the frame and the support for the article to be stamped provided with a ledge to support a stamp strip, of an operating arm pivotally mounted in the frame above the support provided with a head portion, a bearing plate pivotally connected with the head portion, and a yielding member movable with said bearing plate and having a portion for engagement with said ledge during the descent of the arm.

8. In a machine of the type set forth, the combination with the frame and support for the article to be stamped, of a member pivotally mounted in the frame above the support and provided with a head portion, a bearing plate pivotally connected with the head portion, a yielding member carried by said bearing plate and a spring intermediate the bearing plate and head portion.

9. In a machine of the type set forth, the combination with the frame and support for the article to be stamped, of an operating arm pivotally mounted in the frame above the support provided with a head portion, a bearing plate pivotally connected with the head portion, a yielding plate upon the bearing plate provided with downwardly directed end portions extending below the lower face of the bearing plate.

10. In a machine of the type set forth, the combination with the frame and support for the article to be stamped, of a ledge adapted to support a stamp strip, an operating arm pivotally mounted in the frame above the support and provided with a head portion, a bearing plate upon the head portion adapted when the arm is vibrated to pass the ledge, and a spring plate upon the top of the bearing plate provided with a downwardly extending end adapted to engage the ledge during the descent of the arm.

11. In a machine of the type set forth, the combination with the frame and support for the article to be stamped, of a ledge adapted to support the projecting end of a perforated stamp strip, a vibratory member mounted in the frame above the support, a bearing plate upon the member adapted to contact in its travel with the projecting end of the strip, and means upon the member for binding the strip end to the ledge and to the support, during a portion of the travel of the member.

12. In a machine of the type set forth, the combination with a device adapted to support a stamp strip, and means for detaching and affixing individual stamps, of a vibratory arm below the supporting device, means upon the arm for engaging the stamp strip, spring means for advancing the arm after engagement, and means actuated by the detaching means for returning the arm to original position.

13. In a machine of the type set forth, the combination with a device adapted to support a stamp strip, and means for detaching and affixing individual stamps, of a vibratory arm below the supporting device, yielding means upon the arm for engaging the strip, a spring for advancing the arm, and means operated through the detaching means for returning the arm to its original position.

14. In a machine of the type set forth, the combination with a device adapted to support a stamp strip, of means for detaching and affixing individual stamps, a vibratory arm below the supporting device, means upon the arm for engaging the strip, a spring for advancing the arm, means operated by the detaching means for returning the arm to original position, and means for binding the strip during the return movement of the arm.

15. In a machine of the type set forth, the combination with the frame and the support for the article to be stamped, of a rock shaft mounted in the frame, an operating arm upon the shaft extending over the support and provided with stamp affixing means, a second arm upon the shaft, a ledge adjacent the support adapted to support a stamp strip, a vibratory arm pivotally mounted in the frame and actuated by the second arm, yielding means upon the vibratory arm adapted to engage the strip, and a spring connecting the frame and the vibratory arm.

16. In a machine of the type set forth, the combination with a supporting device for a stamp strip and means for affixing individual stamps, of a top plate above the supporting device provided with a groove upon its under face, a vibratory arm below the plate, a lever yieldingly mounted upon the arm provided with an upturned end adapted to register in the groove, and means for positively moving the arm rearwardly.

17. In a machine of the type set forth, the combination with the frame and the support for the article to be stamped, of a shaft in the frame adjacent the support, an operating arm upon the shaft extending over the support and provided with stamp affixing means, a second arm upon the shaft, a device adjacent the support adapted to support a stamp strip, a vibratory arm pivotally mounted on the frame below said device, a spring upon the vibratory arm in the path of the second arm, means upon the vibratory arm for engaging the strip, and a spring connecting the frame and the vibratory arm.

18. In a machine of the type set forth, the combination with a rock shaft, an operating arm upon the rock shaft, means carried by said arm for affixing stamps, a second arm upon the rock shaft, a vibratory arm adapted to feed a stamp strip to the operating arm, means for actuating the vibratory arm in one direction, and a spring upon the vibratory arm in the path of the second arm.

19. In a machine of the type set forth, the combination with the frame and the support for the article to be stamped, of a ledge adapted to support the projecting end of a perforated stamp strip, a vibratory arm mounted in the frame above the support, a bearing plate upon the arm adapted to contact in its travel with the projecting end of the strip, and means for binding the strip end to the ledge and to the support during a portion of the travel of the arm.

20. In a machine of the type set forth, the combination with the frame and the support for the article to be stamped, of a ledge adapted to support the end of a perforated stamp strip, a vibratory member mounted in the frame above the support, yielding means carried by said member adapted to bind the strip to the ledge during a portion of the travel of said member, and means carried by said member adapted to bind the projecting end of the stamp to the support and to cooperate with the ledge to separate the end stamp from the strip.

21. In a stamp affixing machine, the combination with a table or support for the article to be stamped, of a fixed ledge at one side thereof above the support, means for feeding a stamp strip to project the end stamp over the support with the line between said end stamp and the succeeding stamp lying over said ledge, and an affixing device having a pivoted bearing plate adapted to press the projected stamp upon the article, the bearing plate being provided with means adapted to first engage and hold the ends of the stamp and to then coöperate with the ledge to separate the stamp from the strip.

22. In a stamp affixing machine, the combination with a table or support for the article to be stamped, of a fixed ledge at one side thereof above the support, means for feeding a stamp strip to project the end stamp over the support with the line between said end stamp and the succeeding stamp lying over said ledge, and an affixing device comprising a head having an up and down movement, a bearing plate pivotally connected to the head and in position to engage the projected stamp when the head is moved down to coöperate with the support, the bearing plate being provided with means for engaging the free end of the stamp to clamp the same to the article and being adapted to coöperate with the ledge to separate the end stamp from the strip.

23. In a stamp affixing machine, the combination with a table or support for the article to be stamped, of a fixed ledge at one side thereof above the support, means for feeding a stamp strip to project the end stamp over the support with the line between said end stamp and the succeeding stamp lying over said ledge, and an affixing device comprising a head having a bearing plate pivotally connected thereto, said head having an up and down movement and being normally sustained above the projected end stamp of the strip, a spring arranged between the head and the bearing plate and adapted to exert pressure on the forward end of the bearing plate, the said bearing plate being provided with stamp engaging means and being so connected to the head that the ends of the stamp will be engaged first and held and thereafter the plate will coöperate with the ledge to separate the projected stamp from the strip.

In testimony whereof I have affixed my signature in presence of two witnesses.

SAMUEL B. WHITE.

Witnesses:
MAE GALLAGHER,
JOSEPH LANDRY.

Copies of this patent may be obtained for five cents each, by addressing the "Commissioner of Patents, Washington, D. C."